(12) United States Patent
Markley

(10) Patent No.: US 6,387,001 B1
(45) Date of Patent: May 14, 2002

(54) ROLLERLESS CHAIN HAVING SPROCKET-ENGAGING PINS

(75) Inventor: George L. Markley, Montour Falls, NY (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/489,260

(22) Filed: Jan. 21, 2000

(51) Int. Cl.[7] ............................ F16G 13/06; F16G 15/12
(52) U.S. Cl. ........................................ 474/202; 474/223
(58) Field of Search .................................. 474/231, 230, 474/213, 212, 215, 219, 220, 229, 226, 202

(56) References Cited

U.S. PATENT DOCUMENTS

| | | | |
|---|---|---|---|
| 2,155,584 A | * 4/1939 | Bryant et al. | 474/231 |
| 2,512,429 A | * 6/1950 | Jones | 474/231 |
| 2,602,344 A | 7/1952 | Bremer | |
| 3,377,875 A | 4/1968 | Sand | |
| 3,495,468 A | 2/1970 | Griffel | |
| 4,099,424 A | * 7/1978 | Pemberton | 474/230 X |
| 4,134,189 A | * 1/1979 | Richter | 474/231 X |
| 4,186,617 A | 2/1980 | Avramidis et al. | |
| 4,342,560 A | 8/1982 | Ledvina et al. | |
| 4,355,993 A | * 10/1982 | Homeier | 474/231 |
| 4,494,945 A | * 1/1985 | Ogino | 474/231 |
| 4,915,675 A | 4/1990 | Avramidis | |
| 5,092,822 A | 3/1992 | Wakabayashi | |
| 5,192,252 A | 3/1993 | Skurka et al. | |
| 5,226,856 A | 7/1993 | Iacchetta et al. | |
| 5,362,282 A | * 11/1994 | Lickton | 474/220 |
| 5,376,055 A | * 12/1994 | Bauman | 474/218 |
| 5,397,280 A | 3/1995 | Skurka | |
| 5,507,697 A | 4/1996 | Ledvina et al. | |
| 5,690,571 A | 11/1997 | Mott | |
| 5,741,196 A | * 4/1998 | Campagnolo | 474/226 |
| 6,223,515 B1 | * 5/2000 | Koschig et al. | 474/231 X |
| 6,244,032 B1 | * 6/2001 | Christmas et al. | 474/220 X |

* cited by examiner

Primary Examiner—Thomas R. Hannon
Assistant Examiner—Colby Hansen
(74) Attorney, Agent, or Firm—Fitch, Even, Tabin & Flannery; Greg Dziegielewski

(57) ABSTRACT

A chain is provided for use with a pair or a series of sprockets which is generally of the roller variety. In one embodiment, inner and outer links are rotatably mounted to spaced apart pins having a large diameter and held in position on the pins by press fit inner and outer washers. The inner and outer links are interleaved to create the endless chain. One aspect of the invention is the elimination of conventional bushings and rollers. Instead, the pins of the chain have an exposed portion maintained by the washers to contact the teeth of the sprocket directly.

14 Claims, 4 Drawing Sheets

ROLLERLESS CHAIN HAVING SPROCKET-ENGAGING PINS

BACKGROUND OF THE INVENTION

The present invention relates generally to power transmission chains. The invention has particular application to power transmission chains of the roller chain variety, which are used in engine timing applications as well as industrial applications.

Power transmission chains are widely used in the automotive industry. Such chains are used for engine timing drives as well as for the transfer of power in a transfer case. Power transmission chains are also widely used in. industrial applications.

One type of chain is known as "roller chain". A typical roller chain consists of alternate inner links and outer links. The inner links, which are also known as "bushing" links, consist of spaced link plates with bushings tightly received in openings, or apertures, at each end of the links. The outer links, which are also known as "pin" links, consist of spaced links plates with pins tightly received in openings, or apertures, at each end of the sidebars. The bushings freely rotate about the pins to pivotally connect the outer links to the inner links in alternate arrangement. Rollers are provided on the bushings, and when the roller chain is wrapped about a sprocket, the teeth of the sprocket are received between the laterally spaced sidebars and the longitudinally spaced rollers. An example of roller chain is found in U.S. Pat. No. 4,186,617, which is incorporated herein by reference.

Roller chains can include both "true roller" and rollerless design. The true roller design includes the described rollers mounted about the bushings. Rollerless chain contains bushings that directly contact the sprocket. Both types of roller chain are typically specified in industry as British Standard chain and American National Standards Institute (ANSI) chain.

A conventional roller chain drive is comprised of a roller chain wrapped about at least two sprockets supported by shafts. The chain is endless and assembled from interconnected links that are adapted to fit over and about teeth formed on the sprockets. Movement of a driving sprocket causes power transmission through the chain and consequent movement of a driven sprocket. In an engine timing drive application, the driving sprocket may be mounted on the engine crankshaft and the driven sprocket mounted on a valve camshaft. The rotation of the camshaft is thus controlled by the rotation of the crankshaft through the roller chain. Timing drive applications can include the use of a power transmission chain to drive a plurality of sprockets or in the camshaft to camshaft drive in an overhead camshaft engine.

Noise is associated with chain drives. Noise is generated by a variety of sources, but in roller chain drives it can be caused by the impact sound generated by the collision of the chain and the sprocket at the onset of meshing. The loudness of the impact sound is affected, by among other things, the impact velocity between the chain and the sprocket and the impact of the steel rollers or bushings against the steel or powdered metal sprockets.

Many efforts have been made to decrease the noise level and pitch frequency distribution in chain drives of both the silent chain and the roller chain variety. Modification of sound patterns in silent chain drives was addressed in U.S. Pat. No. 4,342,560, by changing the configuration of link flanks. In U.S. Pat. Nos. 3,377,875 and 3,495,468, the sprocket teeth were relieved to achieve noise reduction in contacts between the silent chain and sprocket. Other efforts to reduce noise resulted in use of phased chain and sprocket systems as shown in U.S. Pat. No. 5,397,280.

A problem with conventional roller chains is directed to the bushings. The bushings of conventional roller chains are typically cylinders formed from flat metal. Formation of the bushing leaves a longitudinal seam along one edge. During assembly of the roller chain, the seam, if located at a point of contact with the pin may cause rapid wear in the chain and may cause premature lengthening or failure of the chain.

Another major problem associated with chains of conventional construction is that the strength and elasticity of the inner links and the outer links may vary significantly. Attempts to address this issue via special guide link designs are exemplified by Avramidis, U.S. Pat. No. 4,915,675, and Bremer, U.S. Pat. No. 2,602,344. Whereas these methods have resulted in measurable improvements, results are better when these methods are applied in transmission chains in which the conventional links are stronger. With the weaker and less rigid links of timing chains and, particularly, the links of narrow timing chains, the results are less successful because the strength discrepancy between the sprocket engaging inner links and the guide links is substantial.

In addition, in chains of conventional construction, because there are at least two different types of links, problems often arise associated with variance of lengths of the different links.

The present invention includes a chain which is constructed of fewer types of parts than a conventional roller chain. The present invention seeks to provide a modified roller chain wherein the pins directly engage the sprocket teeth for power transmission. The present invention seeks to provide several embodiments for noise reduction. The present invention also seeks to provide a simplified chain construction that is stronger in a given width, has improved wear characteristics and is more simple and economical to manufacture than a conventional roller chain.

SUMMARY OF THE INVENTION

In accordance with one embodiment of this invention, a modified roller chain is provided which avoids the use of conventional bushings and rollers. Instead, a central pin directly contacts the sprocket teeth. The modified roller chain, provided for use with a pair or a series of sprockets, includes a series of interleaved inner links and outer links. The inner and outer links are made up of the same type of link plate. Each link plate has a pair of apertures, each rotatably receiving a relatively large diameter pin. Each outer link has a pair of outer link plates rotatably mounted to the spaced pin members and a pair of outer keepers securely fit onto the ends of the pin members. The keepers in the outer link rows are washer shaped members located outside of the outer links.

Each inner link has a pair of inner link plates rotatably mounted to the pin members and a pair of inner keepers securely fit onto the pin members. The keepers in the inner link rows are located inside of the inner links and maintain a central section of the pin members in an exposed condition for engagement with a sprocket having a single row of teeth.

The chain of the present invention is also suitable for use with a variety of sprocket tooth forms, including sprockets with dual rows of teeth. In this instance, the inner keepers are eliminated and the inner links are located at the center of the pin members. The outer links and outer keepers are positioned inward from the pin ends as well, flanking the inner links, thereby leaving the ends of the pins exposed to engage with the dual rows of sprocket teeth. The inner and outer links wrap over the sprocket in the space between the rows of teeth.

In this second embodiment, randomization to achieve noise reduction is accomplished by providing pins having varied lengths between link rows. Varying the pin lengths between a first set of pin members having a first length and other pin members having different lengths and ordering the different pin lengths in a predetermined random pattern attempts to randomize or alter the pattern of contacts with the sprocket to result in generation of less noise than is produced by identical pins impacting the dual row sprocket.

Altering the profile of the sprocket teeth, as is known in the art is another technique expected to produce noise reduction with the chain assembly of the present invention.

In addition, causing one row of the dual sprocket to become slightly out of phase with respect to the other may also result in a reduction in generation of noise. In this instance, as the chain engages the sprocket, one end of each pin will engage a respective tooth before the other end engages a tooth on the other row of the sprocket.

The pins of the present invention preferably have a diameter near or equal to the diameter of a standard roller. By making the link plates thicker in the chain of the present invention as compared to the link plates of a conventional roller chain, the pins can have a relatively large diameter and the chain will possess the same or greater load capacity of a conventional roller or rollerless chain.

Since only one type of link plate is necessary for the chain of the present invention, variation between link plates is reduced. Thus, control of link lengths and aperture diameters is improved. Reduction of the number of parts necessary to produce the chain simplifies manufacturing, which reduces manufacturing costs and improves quality control.

For a further understanding of the present invention and the objects thereof, attention is directed to the drawings and the following brief description thereof, to the detailed description of the preferred embodiments of the invention and to the appended claims.

DETAILED DESCRIPTION OF THE PREFERRED EMBODIMENTS

Figure 1:
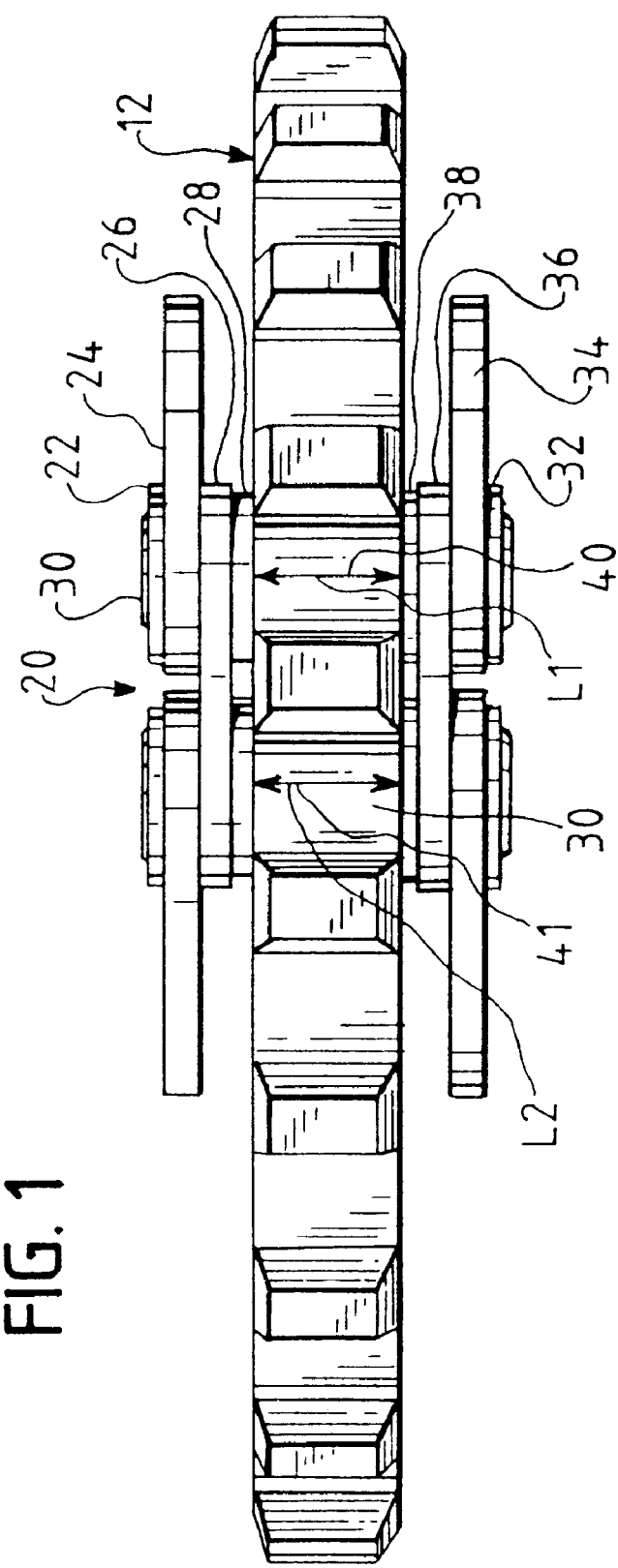
FIG. 1 top view of a portion of the chain of the present invention engaged with a sprocket.
Figure 2:
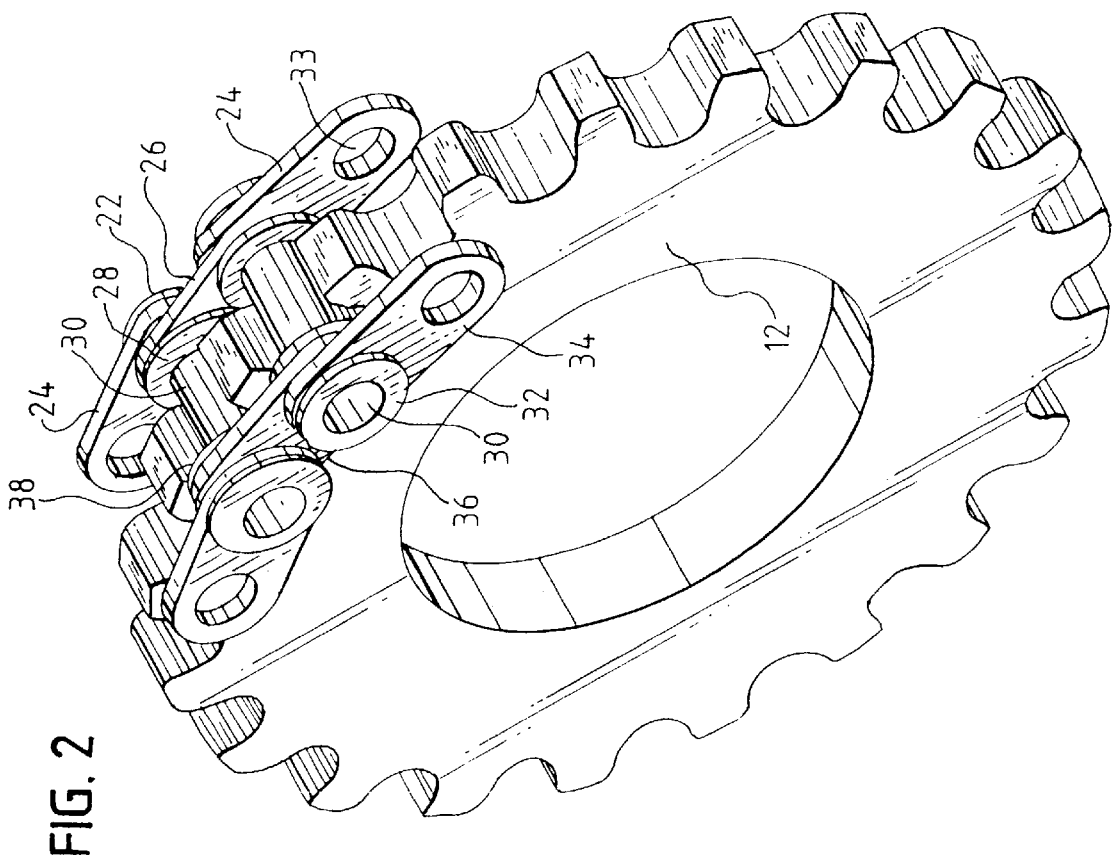
FIG. 2 is a perspective view of the chain portion and sprocket shown in FIG. 1.

Turning now to the drawings, FIGS. 1 and 2 illustrate a portion of 30 the chain of the present invention generally at 20 engaging a sprocket 12. The chain is constructed by a series of link plates, pins and washers. The chain 20 includes an assembly of link plates, pins and washers combined into a series of interleaved outer links and inner links. The outer links are formed by a pair of outer link plates 24, 34. The inner links include a pair of inner link plates 26, 36. Each of the outer and inner link plates are generally flat plates with symmetrical rounded ends. Since all the link plates are identical within achievable manufacturing tolerances, the orientation of each link plate is not critical regardless of location within the chain.

The outer link plates 24, 34 are fitted to a pair of generally cylindrical pins 30. The pins are spaced apart and fitted through apertures 33 in the outer link plates. The pins are free to rotate in the apertures. At the outside edge of the chain about each end of each pin adjacent the outer link plates are washers or keepers 22, 32. The keepers are securely fit to the pins, typically by press fit, or by welding, or any other means known in the art. Preferably, the pins are riveted to provide an additional means to secure the outer keepers 22, 32 in place. In the art, riveting refers to the practice of expanding the pin ends to prevent loss of mounted elements such as the link plates, and so on. It should be noted that the purpose of the keepers is to maintain the position of the link plates on the pin. By doing so the link plates are free to rotate about the pin which allows the chain to bend or wrap about the sprocket. In addition, the keepers, by confining the link plates to a predetermined position on the shaft of the pin, provide at least one exposed portion of each of the pins for engaging the sprocket teeth.

The inner link plates 26, 36 are fitted to the pair of pins 30. Keepers 28, 38 are securely fit to the pins adjacent the inside face of each inner link plate. The keepers 28, 38 are separate from one another and maintain a span 40 in the center portion of each pin 30. The span 40 measures the same distance as the thickness of the sprocket 12 for which the chain is intended to engage plus an additional distance necessary for clearance.

The chain of FIGS. 1 and 2 is assembled by securing inner keepers 28, 38 onto a pin 30. Inner links 26, 36 are first placed onto each inner link row adjacent the inner keepers. Outer links 24, 34 are placed onto each outer link row overlapping the inner links. Outer keepers 22, 32 are secured onto the end of each pin completing the chain. During assembly, care must be taken to maintain the span 40 in the center of the chain to ensure that the chain will properly contact the sprocket. In this manner, inner and outer links are interconnected in a series in alternate manner to form the endless chain. The length of the chain and exact number of inner and outer links is determined by, among other things, the application and ratio and center distance between the sprockets. The application also determines to some extent the thickness of link plates in each row.

The pins of the chain contact the teeth of the sprocket 12 and seat in the root between the sprocket teeth. The outer links and inner links are constructed so that the teeth of the sprocket can be received between the link plates and between the pins.

Figure 3:
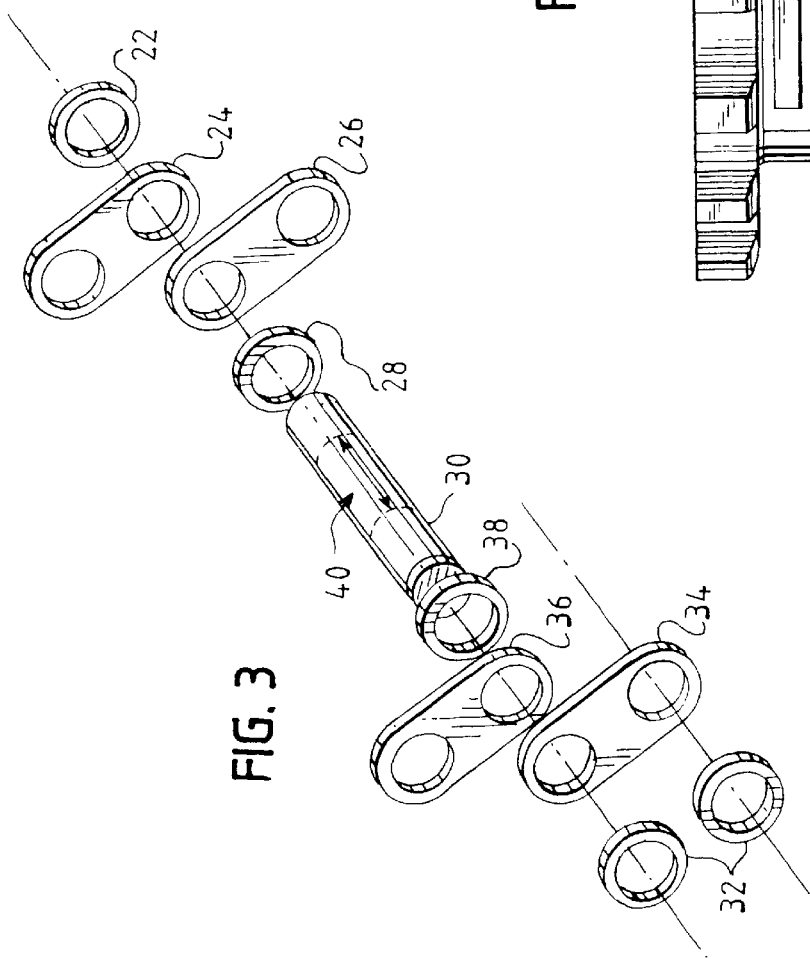
FIG. 3 is an exploded view of a portion of the chain of FIGS. 1 and 2.

FIG. 3 shows an exploded view of a portion of the chain of FIGS. 1 and 2. An exposed center span 40 of the pin 30 is flanked by a pair of inner keepers 28, 38 which are fixed to the pin 30. A pair of inner link plates 26, 36 are rotatably mounted to the pin 30 adjacent and outside of the inner keepers. A pair of outside links 24, 34 are rotatably mounted onto the pin 30 adjacent and outside the inner link plates. Outer keepers 22, 32 are fixed to the ends of the pin 30 to retain the loosely mounted inner and outer link plates on the pin. The keepers are secured to the pin to keep the link plates in position. However, the keepers must not prevent the link plates from rotating relative to the pin.

Figure 4:
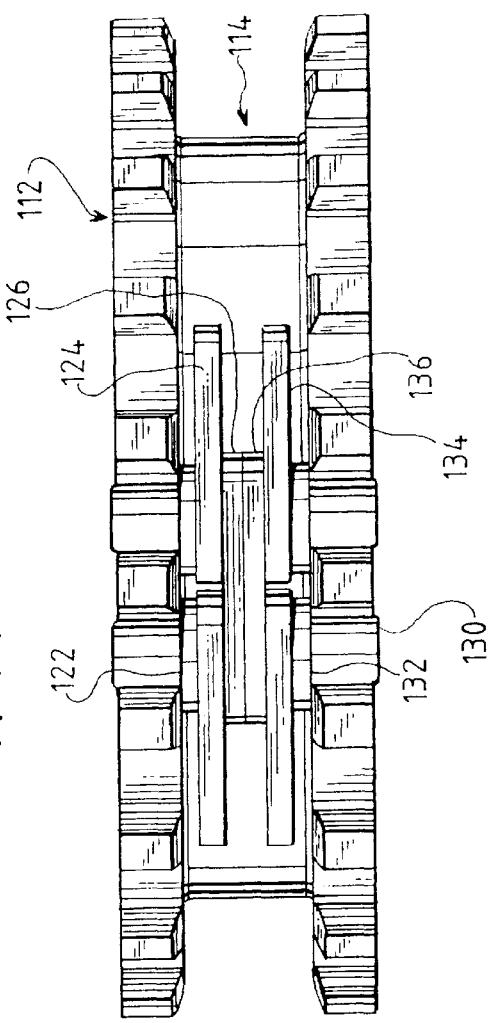
FIG. 4 is a top view of a portion of the chain of the present invention engaged with a double row sprocket.
Figure 5:
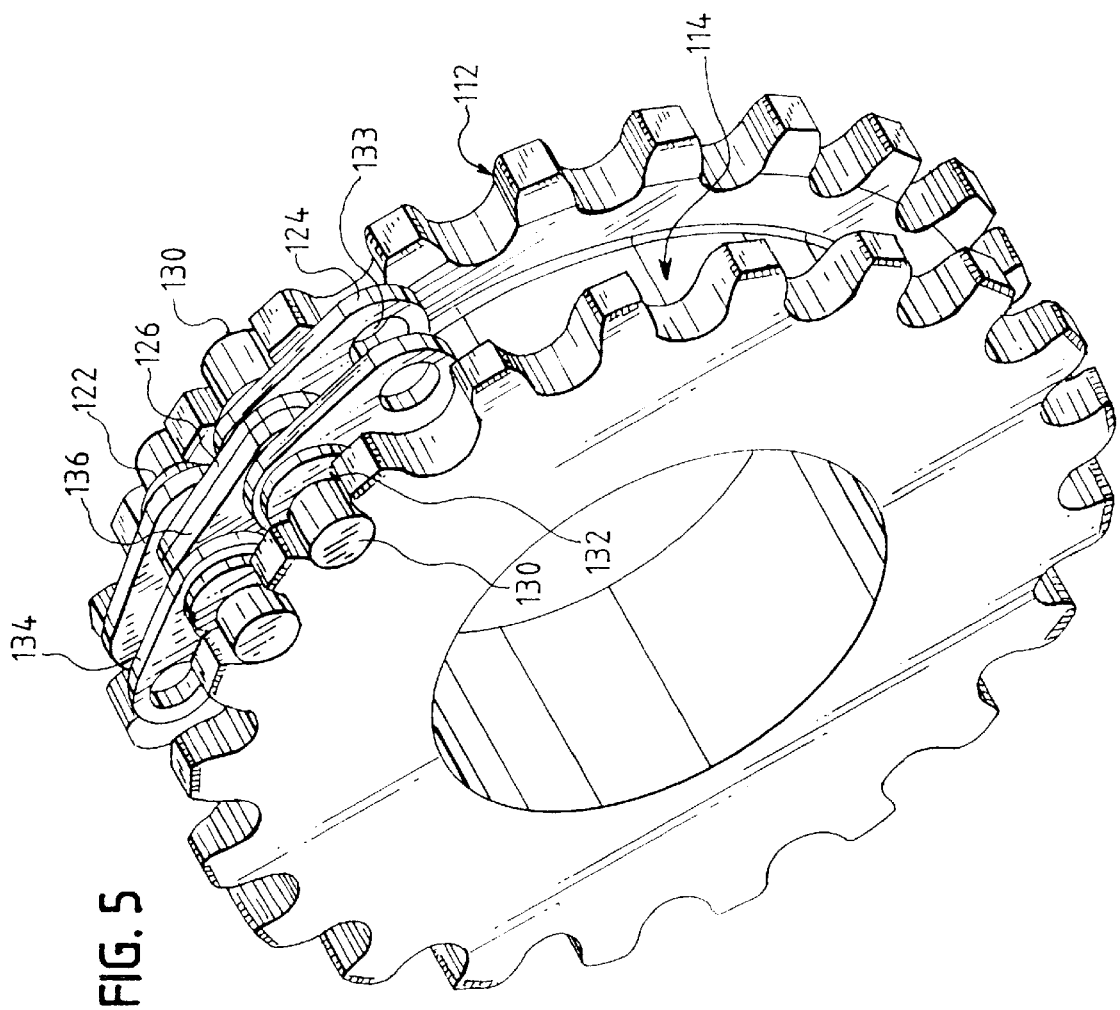
FIG. 5 is a perspective view of the chain portion and sprocket shown in FIG. 4.

In FIGS. 4 and 5 another embodiment of the present invention is shown. The present invention also has application to chains for use with sprockets with multiple rows of teeth. In this embodiment, the center spans of the pins between the inner links are eliminated by locating the inner and outer links flanked by the outer keepers in the centermost portion of the pins. The ends of the pins are thus exposed and utilized to engage the teeth of a double row sprocket.

Inner link plates 126, 136 are rotatably positioned to the center of a pair of pins 30. The pins are spaced apart and fitted through apertures 133 in the inner link plates. The inner links 126, 136 may be replaced by a single link plate comparable in thickness to the pair of link plates 126, 136, but this would require manufacture of an additional part and may result in a commensurate increase in parts and manufacturing costs. The inner link plates are located to the center of the chain in contact with each other.

Outer link plates 124, 134 are rotatably positioned to the pins 30. The outer link plates 124, 134 are mounted on the pins adjacent the inner link plates 126, 136. Outer keepers 122, 132 are secured to the pins adjacent the outer faces of the outer link plates. The outer keepers must be fit onto the pins in such a way that they do not restrict the ability of the link plates to rotate freely about the pins and still avoid excess motion of the link plates in a lateral direction.

Construction of the present invention with all the link plates and outer keepers positioned to the center of the pins causes a substantial portion of the ends of the pins to become exposed. When the chain of this embodiment is wrapped about a double row sprocket, the exposed pin ends of one side of the chain engage the teeth of the first row of sprocket teeth and the pin ends of the other side of the chain engage the teeth of the second row of sprocket teeth. The link plates and keepers travel about the sprocket in a groove 114 formed about the circumference of the sprocket between the rows of teeth.

One embodiment, which is directed to randomization to reduce the generation of noise, when used with a standard sprocket having teeth equally spaced around the periphery of the sprocket, is to employ pins of differing lengths, i.e., center spans between link rows. For example, link/center span length 40 (L1) may be adjacent a pin having a different link/center span length 41 (L2), as illustrated in FIG. 1. Alternating or ordering the different length pins/center spans in a predetermined pattern would create an altered noise pattern as compared to that which would be created using identical length pins/center spans.

The present invention contemplates several patterns of pin length that would result in an altered noise pattern. One such pattern would be to alternate different pin lengths in the chain. Examples of an alternate pattern would include providing a first length pin (1) followed by a second length pin (2). Thus, the pattern could be expressed as: 1,2,1,2,1,2, and so on. Another alternate pattern could be expressed as: 1,1,2,2,1,1,2,2, and so on. Another such variation would be to provide different length pins in a predetermined pattern. Examples of predetermined patterns, i.e., not alternate or strictly random, could be expressed as: 1,2,3,3,2,1, and so on, or 1,2,1,3,2,3,1,2,1,3,2,3, and so on. Providing different pin lengths in a random manner is a further embodiment employing the chain assembly of the present invention to create an altered noise pattern. An example of such a random pattern could be expressed as: 1,2,1,3,3,2,3,1,1,2,1,2,3,1; wherein a pattern is not evident.

Modification of the sprocket itself could also provide noise reduction benefits when used with the chain of the present invention. Modifying the sprocket by altering the tooth profile as known in the art is one alternate embodiment. Causing one row of the double row sprocket to be slightly circumferentially offset or phased with respect to the other row would alter the impact noise of regular pin engagement. To avoid excess rocking of the chain, the phase difference should be small, for example about 0.01°. Use of a phased sprocket assembly with two or more chains of the present invention is also contemplated.

While several embodiments of the invention are illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A chain assembly for use with a sprocket, said chain assembly having a series of interleaved inner links ad and outer links;

each outer link having a pair of outer link plates mounted to a pair of spaced pin members, said pin members having a substantially uniform diameter, said outer plates being permitted to freely rotate with respect to said pin members;

each inner link having a pair of inner link plates mounted to at least one of said pair of spaced pin members, said inner plates being permitted to freely rotate with respect to said pin members;

a plurality of keepers secured about said pin members, said keepers having an opening therein sized to accept said pin members therethrough, a first pair of keepers being press fit on said pin members and located inside of said inside link plates, a second pair of said keepers being press fit on said pin members and located outside of said outside link plates, said outside link plates and said inner link plates being held in position in the lateral direction on said pin members by said plurality of keepers, said pin members being constructed and arranged to contact the teeth of an associated sprocket.

2. The chain assembly of claim 1 wherein said keepers have a substantially uniform thickness and are positioned along said pin to provide at least one exposed central pin portion having a predetermined length on each said pin for engaging with said sprocket when said chain assembly is wrapped about said sprocket.

3. The chain assembly of claim 2 wherein some of said pin members have central pin portions having a first length and others of said pin members have central pin portions having different lengths.

4. The chain assembly of claim 3 wherein said pin members having central pin portions of said first length are alternately arranged with said pin members having central pin portions of said different lengths.

5. The chain assembly of claim 3 wherein said pin members having central pin portions of said first length are arranged in a predetermined pattern with said pin members having central pin portions of said different lengths.

6. The chain assembly of claim 3 wherein said pin members having central pin portions of said first length are randomly arranged with said pin members having central pin portions of said different lengths.

7. A chain assembly for use with a sprocket, said chain assembly having a series of interleaved inner links and outer links;

each outer link having a pair of outer link plates rotatably mounted to a pair of spaced pin members, each of said outer link plates having an outside face;

each inner link having a pair of inner link plates rotatably mounted to at least one of said pair of pin members, said pin members each having a substantially uniform diameter, each of said inner link plates having an inside face;

a plurality of keepers secured about said pin members, said keepers having an opening therein sized to accept said pin members therethrough, wherein said keepers include a plurality of inner keepers and a plurality of outer keepers;

said inner keepers being located adjacent to said inside face of said inner link plates, said inner keepers being positioned along said pin to provide a central span of a predetermined length on each of said pin members, said central span of each of said pin members being positioned for engagement with said sprocket when said chain is wrapped about said sprocket;

said outer keepers being located adjacent to said outside faces of said outer link plates.

8. The chain assembly of claim 7 wherein said chain assembly has a plurality of different predetermined central span lengths.

9. A chain assembly for use with a sprocket, said chain assembly having a series of interleaved inner links and outer links;

each outer link having a pair of outer link plates mounted to a pair of spaced pin members;

each inner link having a pair of inner link plates mounted to at least one of said pair of spaced pin members, said pin members each having a central portion of a predetermined length disposed between said pair of inner link plates;

said pin members being constructed and arranged to contact the teeth of an associated sprocket;

said chain assembly having a plurality of different predetermined central pin portion lengths arranged in a pattern effective to reduce noise generated by the contact of the pins with the sprocket.

10. The chain assembly of claim 9 wherein the plurality of different central pin portion lengths consists of some said pin members having a first central pin portion length and others of said pin members having different central pin portion lengths.

11. The chain assembly of claim 10 wherein said pin members having said first central pin portion length are alternately arranged with said pin members having said different central pin portion lengths.

12. The chain assembly of claim 10 wherein said pin members having said first central portion length are arranged in a predetermined pattern with said pin members having said different pin central portion lengths.

13. The chain assembly of claim 10 wherein said pin members having said first central pin portion length are randomly arranged with said pin members having said different pin central portion lengths.

14. The chain assembly of claim 9 wherein said outer plates are permitted to freely rotate with respect to said pin members and said inner plates are permitted to freely rotate with respect to said pin members.

* * * * *